United States Patent [19]

Scriver et al.

[11] Patent Number: 4,522,970

[45] Date of Patent: Jun. 11, 1985

[54] TIRE WITH TREAD RUBBER CONTAINING MEDIUM VINYL POLYBUTADIENE WITH CLAY AND CARBON BLACK

[75] Inventors: Richard M. Scriver, Grand Duchy Luxembourg, Luxembourg; Wayne H. Stair, Munroe Falls, Ohio

[73] Assignee: The Goodyear Tire & Rubber Company, Akron, Ohio

[21] Appl. No.: 624,326

[22] Filed: Jun. 25, 1984

[51] Int. Cl.$^3$ ............ C08K 3/34; C08K 3/04; C08L 9/00; C08L 9/06
[52] U.S. Cl. .................. 524/447; 523/152; 524/526; 152/209 R
[58] Field of Search .......... 524/447, 526; 523/152; 152/209 R, 330 R

[56] References Cited

U.S. PATENT DOCUMENTS

| | | |
|---|---|---|
| 3,227,675 | 1/1966 | Papalos .................... 524/447 |
| 3,280,084 | 10/1966 | Zelinski et al. . |
| 3,301,840 | 1/1967 | Zelinski . |
| 3,363,659 | 1/1968 | Keckler et al. . |
| 3,725,331 | 4/1973 | Lesage et al. . |
| 3,827,991 | 8/1974 | Ando et al. . |
| 3,938,574 | 2/1976 | Burmester et al. ........... 524/526 |
| 3,978,165 | 8/1976 | Stumpe, Jr. et al. . |
| 4,111,867 | 9/1978 | Komuro et al. ............ 524/526 |
| 4,230,841 | 10/1980 | Prudence . |
| 4,259,218 | 3/1981 | Haws ..................... 524/526 |
| 4,321,168 | 3/1982 | Ueda et al. ............... 524/526 |
| 4,398,582 | 8/1983 | Yoto et al. ............... 524/526 |
| 4,400,485 | 8/1983 | Mukamal et al. ........... 524/447 |

FOREIGN PATENT DOCUMENTS

| | | |
|---|---|---|
| 2158575 | 11/1971 | Fed. Rep. of Germany . |
| 1261371 | 1/1972 | United Kingdom . |
| 1320945 | 6/1975 | United Kingdom . |
| 1166832 | 10/1979 | United Kingdom . |
| 2046277 | 11/1980 | United Kingdom . |

OTHER PUBLICATIONS

PRT, *Polymer Age*, Sep., 1973, pp. 332–337.

*Primary Examiner*—Allan M. Lieberman
*Attorney, Agent, or Firm*—H. C. Young, Jr.

[57] ABSTRACT

A pneumatic tire with sulfur cured rubber tread composition containing a medium vinyl polybutadiene rubber and at least one rubber selected from cis 1,4-polyisoprene rubber, styrene/butadiene copolymer rubber and cis 1,3-polybutadiene rubber. The composition also contains both carbon black and clay reinforcement in conjunction with a 3,3'-bis(trimethoxysilylpropyl) polysulfide.

11 Claims, No Drawings

TIRE WITH TREAD RUBBER CONTAINING MEDIUM VINYL POLYBUTADIENE WITH CLAY AND CARBON BLACK

FIELD OF INVENTION

This invention relates to tires. The invention particularly relates to pneumatic rubber tires having a rubber tread composition.

BACKGROUND OF THE INVENTION

Pneumatic rubber passenger and truck tires are composed of elements which conventionally include a tread of a rubber composition. The tread rubber is sometimes desirably compounded to provide a tire with a relatively low rolling resistance with reasonable wear and traction.

Although it is desired to compound the tire's tread composition to reduce the rolling resistance of the tire without substantially degrading the tire's traction features, usually tire traction is often expected to be somewhat sacrificed as may be evidenced by its decrease in wet and dry skid resistance.

The various tread rubber compositions typically contain carbon black reinforcement. In some instances, a portion of the carbon black might be replaced with silica in which case a coupling agent is used to enhance the reinforcing effect of the silica. A typical reinforcing agent is 3,3'-bis(trimethoxysilylpropyl) polysulfide and is taught in U.S. Pat. Nos. 3,878,489 and 4,278,587.

Various blends of rubbers have been proposed, taught and/or used for rubber tread compositions. For example, rubber blends of various combinations of medium vinyl polybutadiene (containing about 20–50 percent vinyl 1,2-structure), together with styrene/butadiene copolymer, cis 1,4-polyisoprene and/or cis 1,3-polybutadiene rubbers.

Typically carbon black is used for rubber reinforcement. Although an alternate reinforcement in the form of kaolin clay as a replacement for a portion of the carbon black may be desired for various purposes, use of the clay in such a rubber blend of polybutadiene and styrene/butadiene rubber in a tire tread was observed to be unsuccessful because the tire's treadwear was reduced.

In practice, various rubber compositions have been prepared for various purposes, some of which have included tire treads, which compose a polybutadiene containing a degree of 1,2-monomer configuration, sometimes referred to as vinyl content. Representative of such various compositions include those, for example, taught in various patent specifications such as U.S. Pat. No. 3,937,681 relating to a tire tread of polybutadiene containing twenty-five to fifty percent of its monomer units in a 1,2-position, British Pat. No. 1,166,832 relating to a tire tread of "high vinyl" butadiene rubber containing at least fifty percent of 1,2-addition, U.S. Pat. No. 4,192,366 relating to a tire tread of polyisoprene and medium vinyl polybutadiene rubbers, U.S. Pat. No. 4,259,218 relating to a composition of "medium vinyl" polybutadiene and blends thereof with natural rubber where such composition is required to contain a certain carbon black, U.S. Pat. No. 3,978,165 relating to a composition, taught to be useful for tire treads composed of (a) "medium vinyl" polybutadiene, (b) polybutadiene and (c) butadiene/styrene rubbers, German Pat. No. DE 2936-72 relating to mixtures of polybutadiene containing 35–70% of 1,2-units mixed with polyisoprene rubber and, optionally, with cis polybutadiene or styrene-butadiene rubber for tires, and U.S. Pat. Nos. 3,827,991, 4,220,564 and 4,224,197 relating to combinations of polybutadiene containing at least seventy percent of 1,2-configuration with various other rubbers.

Although such rubber compositions are taught to provide various benefits, some for tire treads, it continues to be desirable to provide a pneumatic tire having a rubber tread having an enhanced rolling resistance commensurate with reasonable traction qualities while still providing good treadwear.

STATEMENT AND PRACTICE OF INVENTION

In accordance with this invention, a pneumatic tire is provided having an outer circumferential tread adapted to be ground contacting where said tread is a sulfur cured elastomeric composition comprised of, based on 100 parts by weight rubber (phr), (A) about 50 to about 90, preferably about 55 to about 85, phr medium vinyl polybutadiene rubber having about a 30 to about 55, preferably about 35 to about 48, percent vinyl content, (B) about 50 to about 10, preferably about 45 to about 15, phr of at least one rubber selected from cis 1,4-polyisoprene rubber, cis 1,3-polybutadiene rubber and styrene/butadiene copolymer rubber, (C) about 5 to about 20, preferably about 5 to about 15, phr kaolin clay, (D) about 50 to about 80, preferably about 55 to about 75, phr reinforcing carbon black and (E) about 1 to about 6, preferably about 1 to about 4 phr of a 3,3'-bis(trimethoxysilylpropyl) polysulfide.

In the practice of this invention, the medium vinyl content of the required polybutadiene refers to the weight percent of monomer content of the polymer in the 1,2-configuration.

The cis 1,4-polyisoprene rubber is selected from at least one of natural and synthetic rubber.

The cis 1,4-polyisoprene rubber typically has a cis 1,4-content of about 96 to about 99 weight percent.

The cis 1,3-polybutadiene rubber is the conventionally low vinyl content (about 2–6%) polybutadiene rubber.

In the practice of this invention, the styrene/butadiene copolymer rubber is selected from at least one of styrene/butadiene copolymer prepared by aqueous emulsion polymerization and styrene/butadiene copolymer prepared by organic solution polymerization.

The styrene/butadiene copolymer rubber is conventionally composed of a styrene/butadiene ratio in the range of about 10/90 to about 40/60. Although the copolymer is conventionally prepared by aqueous emulsion copolymerization, for some purposes a styrene/butadiene copolymer rubber prepared by organic solution polymerization is preferred because it typically has a narrower molecular weight range and typically a higher average molecular weight which affect its physical properties. Both emulsion and solution polymerization methods are relatively well-known to those having skill in such art.

The kaolin clay is in its typical particulate form such as, for example, in a particle size of about 100 to about 300 U.S. mesh size.

The 3,3'-bis(trimethoxysilylpropyl) polysulfide is added for the purpose of being a coupling agent for the clay in the prescribed matrix of blended rubbers. Typically, the polysulfide is a di-, tri- or tetrasulfide, and usually a mixture of such polysulfides, although the tetrasulfide is preferred.

The pneumatic tires are conventionally comprised of a generally toroidal shaped carcass with an outer circumferential tread adapted to be ground contacting, spaced beads and sidewalls extending radially from and connecting said tread to said beads.

The medium vinyl polybutadiene typically has about 10 to about 40 percent of its monomer units in a cis 1,4-configuration and, after allowing for the medium vinyl content (1,2-monomer configuration), the remainder of the polymer is considered to be of monomer units in a trans 1,4-configuration.

The medium vinyl polybutadiene, in its unvulcanized state, can typically be additionally characterized by having a ML-4 (100° C.) viscosity in the range of about 40 to about 120.

These polybutadienes, particularly those in the higher ML-4 viscosity range, can optionally be individually oil extended before mixing with various rubber compounding materials for ease of processing. If oil extension is used, usually about 15 to about 35 phr of rubber processing oil is used, usually of the aromatic or aromatic/paraffinic oil type, to provide a ML-4 (100° C.) viscosity of about 40–80.

The invention can be practiced with medium vinyl polybutadiene rubber produced by various processes, such as those already known in the art.

However, it is a particularly desirable feature of this invention that a particular type of medium vinyl polybutadiene copolymer be used. Although the mechanism, precise physical or chemical property or polymer structure effect is not understood, at least one of or a combination of, depending on the tire and its service conditions, tire properties have been observed to be further enhanced by using such particular medium vinyl polybutadiene. Such enhanced tire properties have included at least one of or a combination of rolling resistance, skid resistance and tread wear.

Such preferred medium vinyl polybutadiene copolymer is of the type prepared by copolymerizing 1,3-butadiene with a very small amount of divinyl benzene in a hydrocarbon solvent system, preferably an essentially non-polar aromatic solvent, with an alkyl lithium catalyst, and one or more polar catalyst modifiers to effect the polymer's vinyl content. For further details concerning such type of medium vinyl polybutadiene and a method of preparation, reference may be made to U.S. Pat. No. 4,230,841 and such patent is hereby incorporated herein by reference.

It should readily be understood by one having skill in the art that said tread portion of the pneumatic tire as well as the rubber or other material in the basic carcass normally also containing reinforcing elements in the tread area, can be compounded by methods generally known in the rubber compounding art, such as mixing the various constituent rubbers with various curing aids, such as accelerators, processing additives, such as oils, resins and plasticizers, fillers, pigments, antioxidants and antiozonants and reinforcing materials such as, for example, carbon black.

The tire can be built, shaped, molded and cured by various methods which will be readily apparent to those having skill in the art.

In the practice of this invention, the polymer blend tread can be integral with and adhered to various tire carcass substrate rubber compositions. Typically, such a rubber composition is at least one of a butadiene/styrene copolymer rubber, cis 1,4-polyisoprene (natural or synthetic rubber) and cis-1,3-polybutadiene. Optionally, such a blend, particularly where the tread is in the region of the sidewall area of the tire may contain one or more of butyl rubber, halobutyl rubber, such as chlorobutyl or bromobutyl rubber, and ethylene/propylene/conjugated diene terpolymer rubber, polyisoprene and polybutadiene rubber.

In the further practice of this invention, the tread can typically be applied in the building of the green tire in which the uncured, shaped tread is built onto the carcass following which the green tire is shaped and cured.

Alternately, the tread can be applied to a cured tire carcass from which the previous tread has been buffed or abraded away and the tread cured thereon as a retread.

The practice of this invention is further illustrated by reference to the following examples which are intended to be representative rather than restrictive of the scope of the invention. Unless otherwise indicated, all parts and percentages are by weight.

EXAMPLE I

Pneumatic tires of conventional construction (grooved tread, sidewalls, spaced beads, and supporting fabric-reinforced carcass) were built, shaped and cured in a conventional tire mold. The tires were of the P215/75R15 type as steel belted (reinforced) radial ply passenger type tires.

One type of tire was prepared as a control and is identified herein as Control A and tires with experimental treads are identified as Experiments B-D.

Control tire A had a tread composed of (A) 70 phr butadiene/styrene rubber, (B) 30 phr low vinyl, or conventional, polybutadiene rubber, and (C) about 70 phr carbon black and is intended to represent a conventional passenger tire.

The tread compositions had been compounded using typical compounding ingredients comprised of carbon black, rubber processing oil, zinc oxide, stearic acid, resin, antidegradant, sulfur and accelerator.

The basic tread compositions are shown in the following Table 1.

TABLE 1

| Compound | Control A | Exp'l B | Exp'l C | Exp'l D |
|---|---|---|---|---|
| SBR Rubber[1] | 96.25 | 96.25 | 96.25 | 0 |
| Polybutadiene Rubber[2] | 30 | 30 | 30 | 30 |
| Medium Vinyl Polybutadiene Rubber[3] | 0 | 0 | 0 | 96.25 |
| Silica[4] | 0 | 15 | 0 | 0 |
| Kaolin Clay | 0 | 0 | 10 | 10 |
| Polysulfide[5] | 0 | 4 | 4 | 4 |
| Processing Oil | 9 | 9 | 9 | 9 |
| Carbon Black | 70 | 55 | 60 | 60 |

[1]Oil extended styrene/butadiene copolymer rubber composed of 70 parts SBR and 26.25 parts processing oil.
[2]Cis 1,3-polybutadiene rubber having low vinyl 1,2-content (e.g. 3–8 percent).
[3]Polybutadiene/divinyl benzene copolymer having a vinyl 1,2-content in the range of about 42–48 percent prepared by copolymerizing 1,3-butadiene with a very small amount (e.g. 1–3 percent) divinyl benzene in presence of lithium catalyst and polar modifier.
[4]Silica obtained as Hi Sil, a hydrated, amorphous silica, from PPG Industries, Inc.
[5]Si69 from DeGussa Corporation and reportedly a 50/50 mixture of 3,3'-bis(trimethoxysilylpropyl) polysulfide, particularly the tetrasulfide, and carbon black.

The tires were mounted on rims, inflated and submitted to testing. The test values for the control were normalized to a value of 100 for comparison purposes. The tires with the experimental treads were tested and their test values compared to the values of the control tire and reported relative to the normalized values of 100.

Table 2 illustrates the rolling resistance, wet skid resistance and treadwear values with the experimental tires B-D having their experimental treads compared to values of control tire A normalized to 100.

TABLE 2

| Measured Values | Control A | Exp'l B | Exp'l C | Exp'l D |
| --- | --- | --- | --- | --- |
| Rolling resistance | | | | |
| Twin Roll | 100 | 103 | 109 | 122 |
| 67" Wheel | 100 | 100 | 103 | 112 |
| Wet skid resistance | | | | |
| Concrete surface | 100 | 101 | 108 | 102 |
| Macadam surface | 100 | 105 | 103 | 101 |
| Treadwear (25,601 miles) | 100 | 104 | 92 | 98 |

As expected, the substitution of silica in Experimental tread "B", together with the coupling agent, for a part of the carbon black in control tread "A" produced satisfactory results.

Also, as expected, the substitution of the clay in Experimental tread "C" for the silica in Experimental tread "C" demonstrated a reduced treadwear rating. Although the rolling resistance was improved, an uneven, increased treadwear was observed.

However, by replacing the SBR rubber with the medium vinyl polybutadiene (copolymer), it was surprisingly observed that a definitive improvement in the tire's rolling resistance was obtained without a more normally expected trade-off or reduction in skid resistance and/or treadwear. A treadwear almost equivalent to Control "A" was obtained.

In this Example, the rolling resistance was measured by mounting and inflating the tire on a rim and allowing it to be turned by a 67 inch diameter wheel under about 80 percent of its rated load at a peripheral speed of 50 mph (80 km/h) and the drag force measured. The test is believed to be somewhat standard.

The skid resistance for this Example was a standard test in which the tires (A and B) are individually mounted on opposite sides of a weighted, drawn trailer at various speeds and brakes of the trailer applied and skid force (peak and slide) measured.

The treadwear was compared by actually mounting the control and experimental tires on different automobiles and driving them under controlled conditions, with the position of the tires being periodically positionally interchanged between the automobiles.

In these Examples, the preferred medium vinyl polybutadiene rubber was used. Such rubber was of the hereinbefore described type generally prepared by U.S. Pat. No. 4,230,841 which was incorporated herein by reference. As taught, the medium vinyl polybutadiene is prepared by polymerizing 1,3-butadiene with a very small amount of divinyl benzene in an essentially nonpolar aromatic solvent with an alkyl lithium catalyst and at least one polar catalyst modifier.

Representative examples of such solvents are pentane, hexane, heptane, octane, isooctane and cyclohexene, of which hexane is preferred.

Representative examples of alkyl lithium catalysts are methyl lithium, ethyl lithium, propyl lithium, n-butyl lithium, s-butyl lithium, t-butyl lithium and amyl butyl lithium. The n-butyl lithium is preferred.

The amount of catalyst is dependent upon the molecular weight desired for the polymerization. The amount of divinylbenzene can be related to the level of active lithium catalyst. The amount of polar compound is dependent upon the vinyl content desired in the polymer. For example, it is described in said patent that between about 0.10 and 1.0 millimols of active alkyl lithium per hundred grams of butadiene can be used and that a mole ratio of divinylbenzene (DVB) to alkyl lithium can be in the range of about 0.1 to about 0.9. It is preferred that the temperature of the polymerization is maintained substantially constant throughout the polymerization. Various polar modifiers are prescribed, of which the strong catalyst modifiers are exemplified such as mexamethyl phosphoric acid triamide (HMPA), N,N,N',N'-tetramethylethylene diamine (TMEDA), ethylene glycol dimethyl ether (glyme), diethylene glycol dimethyl ether (diglyme), triethylene glycol dimethyl ether (triglyme) and tetraethylene glycol dimethyl ether (tetraglyme).

While certain representative embodiments and details have been shown for the purpose of illustrating the invention, it will be apparent to those skilled in this art that various changes and modifications may be made therein without departing from the spirit or scope of the invention.

We claim:

1. A pneumatic tire having an outer circumferential tread adapted to be ground contacting, where said tread is a sulfur cured product of an elastomeric composition comprised of, based on 100 parts of weight rubber (phr), (A) about 50 to about 90 phr of medium vinyl polybutadiene rubber having about a 30 to about 55 percent vinyl content and having in its unvulcanized state, an ML4(100° C.) viscosity in the range of about 40 to about 120, (B) about 50 to about 10 phr of at least one rubber selected from cis 1,4-polyisoprene rubber, cis 1,3-polybutadiene rubber and styrene/butadiene copolymer rubber (C) about 5 to about 20 phr kaolin clay, (D) about 50 to about 80 phr reinforcing carbon black and (E) about 1 to about 6 phr of a 3,3'-bis(trimethoxysilylpropyl) polysulfide.

2. The tire of claim 1 where said polysulfide is primarily a tetrasulfide.

3. The tire of claim 1 where said styrene/butadiene copolymer rubber is composed of a styrene/butadiene ratio in the range of about 10/90 to about 40/60 and is selected from at least one of the group consisting of aqueous emulsion co-polymerized styrene and 1,3-butadiene, and solvent solution co-polymerized styrene and 1,3-butadiene, the cis 1,4-polyisoprene rubber is selected from at least one of the group consisting of natural rubber and synthetic rubber and the said polysulfide is selected from di-, tri-, and tetra-sulfides and mixtures thereof.

4. The tire of claim 2 where said styrene/butadiene rubber is prepared by aqueous emulsion polymerization.

5. The tire of claim 2 where said styrene/butadiene rubber is prepared by organic solution polymerization.

6. The tire of claim 3 where said polysulfide is primarily a tetrasulfide.

7. The pneumatic tire of claim 3 where the said medium vinyl polybutadiene in its uncured state has a ML4(100° C.) in the range of about 40 to about 120 and is of the type prepared by polymerizing 1,3-butadiene with a small amount of divinyl benzene in a hydrocarbon solvent system with an alkyl lithium catalyst and in the presence of at least one polar catalyst modifier.

8. The tire of claim 7 where the said polysulfide is primarily a tetrasulfide.

9. A pneumatic tire comprised of a generally toroidal shaped carcass with an outer circumferential tread adapted to be ground contacting, spaced beads and sidewalls extending radially from and connecting said tread to said beads, characterized in that said tread is a sulfur cured elastomeric composition comprised of, based on 100 parts by weight rubber (phr), (A) about 55 to about 85 phr medium vinyl polybutadiene rubber having about a 35 to about 48 percent vinyl content, (B) about 45 to about 15 phr of at least one rubber selected from cis 1,4-polyisoprene rubber, cis 1,3-polybutadiene rubber and styrene/butadiene copolymer rubber (C) about 5 to about 15 phr kaolin clay, (D) about 55 to about 75 phr reinforcing carbon black and (E) about 1 to about 4 phr of a 3,3'-bis(trimethoxysilylpropyl) polysulfide; where said medium vinyl polybutadiene rubber, in its vulcanized state has an ML4(100° C.) in the range of about 40 to about 120 and is of the type prepared by polymerizing 1,3-butadiene with a small amount of divinyl benzene in a hydrocarbon solvent with an alkyl lithium catalyst and in the presence of a polar catalyst modifier.

10. The tire of claim 9 where said polysulfide is selected from di-, tri- and tetra-sulfides and their mixtures.

11. The tire of claim 10 where said polysulfide is primarily a tetrasulfide.

* * * * *

UNITED STATES PATENT AND TRADEMARK OFFICE
CERTIFICATE OF CORRECTION

PATENT NO. : 4,522,970

DATED : June 11, 1985

INVENTOR(S) : Richard M. Scriver and Wayne H. Stair

It is certified that error appears in the above-identified patent and that said Letters Patent is hereby corrected as shown below:

Column 1, lines 66 & 67 reads - German Pat. No. DE 2936-72 - should read "German Patent No. DE 2936 782".

Signed and Sealed this

Twenty-sixth Day of August 1986

[SEAL]

Attest:

DONALD J. QUIGG

Attesting Officer

Commissioner of Patents and Trademarks